United States Patent
Sasaki et al.

(10) Patent No.: US 8,811,788 B2
(45) Date of Patent: Aug. 19, 2014

(54) MULTI-CORE OPTICAL FIBER AND METHOD OF PRODUCING THE SAME

(75) Inventors: Takashi Sasaki, Yokohama (JP); Tomoyuki Hattori, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/450,509

(22) Filed: Apr. 19, 2012

(65) Prior Publication Data

US 2012/0219261 A1     Aug. 30, 2012

(51) Int. Cl.
*G02B 6/036*  (2006.01)
*C03B 37/01*  (2006.01)
*C03B 37/15*  (2006.01)

(52) U.S. Cl.
USPC .................. 385/126; 385/96; 65/402; 65/408

(58) Field of Classification Search
USPC ..................................... 385/126; 65/402, 408
See application file for complete search history.

(56) References Cited

U.S. PATENT DOCUMENTS

| | | | | |
|---|---|---|---|---|
| 4,087,156 A | * | 5/1978 | Kao et al. | 385/46 |
| 5,720,908 A | * | 2/1998 | Gaillard | 264/1.28 |
| 6,442,318 B1 | * | 8/2002 | Goldman | 385/114 |
| 2004/0146255 A1 | * | 7/2004 | Ishikawa et al. | 385/114 |

FOREIGN PATENT DOCUMENTS

| | | |
|---|---|---|
| JP | S55-033130 | 3/1980 |
| JP | S56-036610 | 4/1981 |
| JP | S61-002110 | 1/1986 |
| JP | 62-144110 | 6/1987 |
| JP | H6-239642 | 8/1994 |
| JP | H9-145968 | 6/1997 |
| JP | 10-104443 | 4/1998 |
| JP | H11-302042 | 11/1999 |
| JP | 2002-296468 | 10/2002 |
| JP | 2003-201140 | 7/2003 |
| JP | 2005-249977 | 9/2005 |
| JP | 2005-292400 | 10/2005 |
| JP | 2008-532073 | 8/2008 |
| JP | 2011-232373 | 11/2011 |
| JP | 2011-232375 | 11/2011 |

* cited by examiner

*Primary Examiner* — Omar Rojas

(74) *Attorney, Agent, or Firm* — Drinker Biddle & Reath LLP

(57) ABSTRACT

A multi-core optical fiber according to the present invention includes plural single-core optical fibers, and comprises an intermediate portion in which a side surface of each single-core optical fiber is covered with a resin layer, and a terminal portion in which the each single-core optical fiber is exposed from the resin layer. In the terminal portion of the multi-core optical fiber, the single-core optical fibers are separated from each other.

29 Claims, 9 Drawing Sheets

MULTI-CORE OPTICAL FIBER AND METHOD OF PRODUCING THE SAME

BACKGROUND OF THE INVENTION

1. Field of the Invention

The present invention relates to a multi-core optical fiber and a method of producing the same.

2. Related Background Art

As an optical fiber acceptable to high density packaging or diameter-reducing of the optical cable, great attention is being focused on the use of a multi-core optical fiber (MCF) in which plural cores are housed in a single fiber. For example, a multi-core optical fiber with various shapes is disclosed in Japanese Patent Application Laid-Open No. H10-104443 (Patent Document 1). Such a multi-core optical fiber assumes mutual connection between multi-core optical fibers or connection to an optical integrated device. As another example of a multi-core optical fiber, for example, Japanese Patent Application Laid-Open No. S62-144110 (Patent Document 2) and Japanese Patent Application Laid-Open No. 2003-201140 (Patent Document 3) disclose an example of manufacturing multi-core fiber by assembling the plurality of preforms by using the assembling glass medium at the center of the glass preform. The assembled preform is drawn into multi-core fiber by applying coatings at the outer portion of the glass fiber, in addition to a directional coupler that is used by directly connecting plural single-core optical fibers to one end of the multi-core optical fiber.

SUMMARY OF THE INVENTION

The present inventors have examined the above prior art, and as a result, have discovered the following problems. That is, in a configuration in which plural cores and a cladding constituting a multi-core optical fiber are composed of silica-based glass, it is not assumed to respectively connect the plural cores constituting the multi-core optical fiber to cores of different single-core optical fibers. Further, it is difficult to realize such core-to-core connection as the connection between single-core optical fibers. For example, in the multi-core optical fiber disclosed in the above Patent Documents 1 and 2, plural cores are covered with a single cladding layer and thus, it is difficult to use each core by performing single-core separation.

Therefore, in the disclosure of the above Patent Document 2, the multi-core optical fiber is enabled to function as a directional coupler by connecting other single-core optical fibers to one end of the multi-core optical fiber. An operation of connecting the multi-core optical fiber to the other single-core optical fibers requires special end face processing or individual precise core alignment and thus, the connection operation becomes very complex. In the disclosure of the above Patent Document 3, prepared is a fiber preform for a multi-core optical fiber including plural glass preforms (hereinafter, referred to as a single-core preform) each to produce a single-core optical fiber, and a glass-based dummy preform provided between the plural single-core preforms while being bonded therebetween, and the prepared fiber preform is drawn. Accordingly, a multi-core optical fiber in which a central space portion surrounded by single-core optical fibers formed from the single-core preforms is densely filled with glass of the dummy preform is obtained. Therefore, it is difficult to separate the multi-core optical fiber after drawing every one single-core optical fiber (single-core separation).

The present invention has been developed to eliminate the problems described above. An object of the present invention is to provides a multi-core optical fiber in which plural single-core optical fibers, each having a core and a cladding which are composed of silica-based glass, are two-dimensionally arranged on a cross-section thereof and which has the structure for easily separating at least a terminal portion thereof every one single-core optical fiber, and a method of producing the same.

A multi-core optical fiber according to the present invention includes plural single-core optical fibers and comprises: an intermediate portion in which the plural single-core optical fibers are covered with a resin layer (a portion in which the plural single-core optical fibers are integrally held); and a terminal portion in which the plural single-core optical fibers are exposed from the resin layer while being separated from each other. Further, in at least one terminal portion of the multi-core optical fiber, the individually separated plural single-core optical fiber is exposed. Accordingly, another terminal portion thereof may include a fiber separated structure as described above and may also have the same structure as the intermediate portion. In the present specification, "separation of single-core optical fiber (single-core separation)" indicates separation of each single-core optical fiber in the terminal portion of the multi-core optical fiber. However, in the use of the multi-core optical fiber, each single-core optical fiber in the intermediate portion may be completely or partially separated from another single-core optical fiber.

In the multi-core optical fiber, each of the plural single-core optical fibers has a core composed of silica-based glass, and a cladding composed of silica-based glass and provided on an outer periphery of the core. The intermediate portion is a portion in which the plural single-core optical fibers are integrally held by a resin layer and integrally twisted while being two-dimensionally arranged at predetermined positions on a cross-section orthogonal to a longitudinal direction of the multi-core optical fiber. The terminal portion is a portion in which the plural single-core optical fibers are exposed from the resin layer constituting a part of the intermediate portion. In the terminal portion, the plural single-core optical fibers are separated from each other.

Further, a method of producing the multi-core optical fiber having the structure as above (a method of producing a multi-core optical fiber according to the present embodiment) comprises: a preprocessing process of preparing a multi-core optical fiber with a predetermined shape; and a post-processing process of exposing a terminal portion of each of the plural single-core optical fibers in one terminal portion of the prepared multi-core optical fiber. In the preprocessing process, a multi-core optical fiber to be prepared includes plural single-core optical fibers each having a core composed of silica-based glass, and a cladding composed of silica-based glass and provided on an outer periphery of the core. In the multi-core optical fiber to be prepared, the plural single-core optical fibers are integrally held by a resin layer and integrally twisted while being two-dimensionally arranged at predetermined portions on a cross-section orthogonal to a longitudinal direction of the multi-core optical fiber. In the post-processing process, in the terminal portion of the prepared multi-core optical fiber, at least a resin layer integrally holding the plural single-core optical fibers is removed. In particular, the resin layer is physically removed or dissolved using a solution. In addition, the physical removal of the resin layer also includes mechanical removal. In the terminal portion of the prepared multi-core optical fiber, each terminal portion of the plural single-core optical fibers is exposed from the resin layer.

As a first aspect of the multi-core optical fiber, each of the plural single-core optical fibers may further have a fiber coating (coating composed of resin or other materials) provided on an outer periphery of the cladding. In this case, the resin layer constituting a part of the intermediate portion may include an integral coating (resin coating) for integrating the plural single-core optical fibers. Accordingly, even for the multi-core optical fiber that includes single-core optical fibers, each having the core and the cladding both of which are composed of silica-based glass, single-core separation (including a state where a single single-core optical fiber is separated from another single-core optical fiber in a portion of the intermediate portion, in addition to a state where the single single-core optical fiber is entirely separated from another single-core optical fiber) may be easily performed.

As a second aspect applicable to the first aspect, on the cross-section of the intermediate portion, arrangement of the plural single-core optical fibers may have rotational symmetry of order 2 or more with respect to a center of the multi-core optical fiber. Further, in the terminal portion, the plural single-core optical fibers may be one-dimensionally arranged. As described above, the cross-section arrangement of the single-core optical fibers has the rotational symmetry of order 2 or more and thus, each of the single-core optical fibers may be easily separated. In addition, by one-dimensionally arranging the individually separated plural single-core optical fibers in the terminal portion, fusion connection or connector processing with another optical fiber becomes easy.

As a third aspect applicable to at least one of the first and second aspects, each of the plural single-core optical fibers may be drawn while being individually twisted. As described above, by employing the single-core optical fibers drawn while being individually twisted, polarization-mode dispersion decreases.

Further, as a fourth aspect applicable to at least one of the first to third aspects, the multi-core optical fiber may be wounded around a bobbin while the integral coating is twisted. It is to prevent an increase in strain occurring due to a difference in a winding length between plural single-core optical fibers included in the multi-core optical fiber.

In addition, as a fifth aspect applicable to at least one of the first to fourth aspects, in the intermediate portion, a recess extending along the longitudinal direction of the multi-core optical fiber may be provided on the integral coating.

A method of producing a multi-core optical fiber according to any one of the first to fifth aspects or a combination of at least two thereof also comprises the aforementioned preprocessing process and post-processing process.

In the preprocessing process, a multi-core optical fiber to be prepared includes plural single-core optical fibers each having a core composed of silica-based glass, a cladding composed of silica-based glass and provided on an outer periphery of the core, and a fiber coating provided on an outer periphery of the cladding. In the multi-core optical fiber to be prepared, the plural single-core optical fibers are integrated by an integral coating and integrally twisted while being two-dimensionally arranged at predetermined portions on a cross-section orthogonal to a longitudinal direction of the multi-core optical fiber.

In the post-processing process, in the terminal portion of the multi-core optical fiber prepared in the preprocessing process, terminal portions of the plural single-core optical fibers are separated from each other by physically cutting the integral coating which integrates the plural single-core optical fibers. Further, "physical cutting of the integral coating" indicates simply snicking the integral coating. In another aspect of the post-processing process, by physically removing the integral coating having integrated the plural single-core optical fibers in the terminal portion of the multi-core optical fiber prepared in the preprocessing process, terminal portions of the plural single-core optical fibers are separated from each other. In yet another aspect of the post-processing process, by dissolving, using a solution, the integral coating integrating the plural single-core optical fibers in the terminal portion of the multi-core optical fiber prepared in the preprocessing process, terminal portions of the plural single-core optical fibers are separated from each other.

Meanwhile, as a sixth aspect of the multi-core optical fiber, the cladding of each single-core optical fiber has a glass surface, and the claddings of the adjacent single-core optical fibers may be fused at parts of the glass surfaces thereof to form an integrated glass body (each glass surface of the plural single-core optical fibers is constituted by fused part and non-fused part). In this case, the resin layer constituting a part of the intermediate portion may include a protective coating (resin coating) protecting the side surface of the integrated glass body. Accordingly, even for the multi-core optical fiber that includes single-core optical fibers, each having a core and a cladding which are composed of silica-based glass, single-core separation may be easily performed.

As a seventh aspect applicable to the sixth aspect, on the cross-section of the intermediate portion, arrangement of the plural single-core optical fibers may have rotational symmetry of order 2 or more with respect to a center of the multi-core optical fiber. Further, in the terminal portion, the plural single-core optical fibers may be one-dimensionally arranged. As described above, the cross-section arrangement of the single-core optical fibers has the rotational symmetry of order 2 or more and thus, each of the single-core optical fibers may be easily separated. In addition, by one-dimensionally arranging the individually separated plural single-core optical fibers in the terminal portion, fusion connection or connector processing with another optical fiber becomes easy.

As an eighth aspect applicable to at least one of the sixth and seventh aspects, the multi-core optical fiber may be wounded around a bobbin while the protective coating is twisted. It is to prevent an increase in strain occurring due to a difference in a winding length between plural single-core optical fibers included in the multi-core optical fiber.

Further, as a ninth aspect applicable to at least one of the sixth to eighth aspects, in the intermediate portion, a recess extending along the longitudinal direction of the multi-core optical fiber may be provided on the protective coating.

A method of producing a multi-core optical fiber according to any one of the sixth to ninth aspects or a combination of at least two thereof also comprises the aforementioned preprocessing process and post-processing process.

In the preprocessing process, a multi-core optical fiber to be prepared includes plural single-core optical fibers each having a core composed of silica-based glass, and a cladding which is composed of silica-based glass, provided on an outer periphery of the core, and has a glass surface. In the multi-core optical fiber to be prepared, the plural single-core optical fibers are integrally twisted while being two-dimensionally arranged at predetermined positions on a cross-section orthogonal to a longitudinal direction of the multi-core optical fiber, the claddings of adjacent single-core optical fibers are fused at parts of the glass surfaces thereof to form an integrated glass body, and the integrated glass body is covered by a protective coating.

In the post-processing process, in the terminal portion of the multi-core optical fiber prepared in the preprocessing process, the protective coating covering the integrated glass body is physically or chemically removed. By dissolving, using a solution, a fused part of the glass surfaces of the adjacent single-core optical fibers among the plural single-core optical fibers, the claddings of plural single-core optical fibers, exposed from the protective coating, are separated from each other.

The present invention will be more fully understood from the detailed description given herein below and the accompanying drawings, which are given by way of illustration only and are not to be considered as limiting the present invention.

Further, scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DESCRIPTION OF THE PREFERRED EMBODIMENTS

Figure 1:
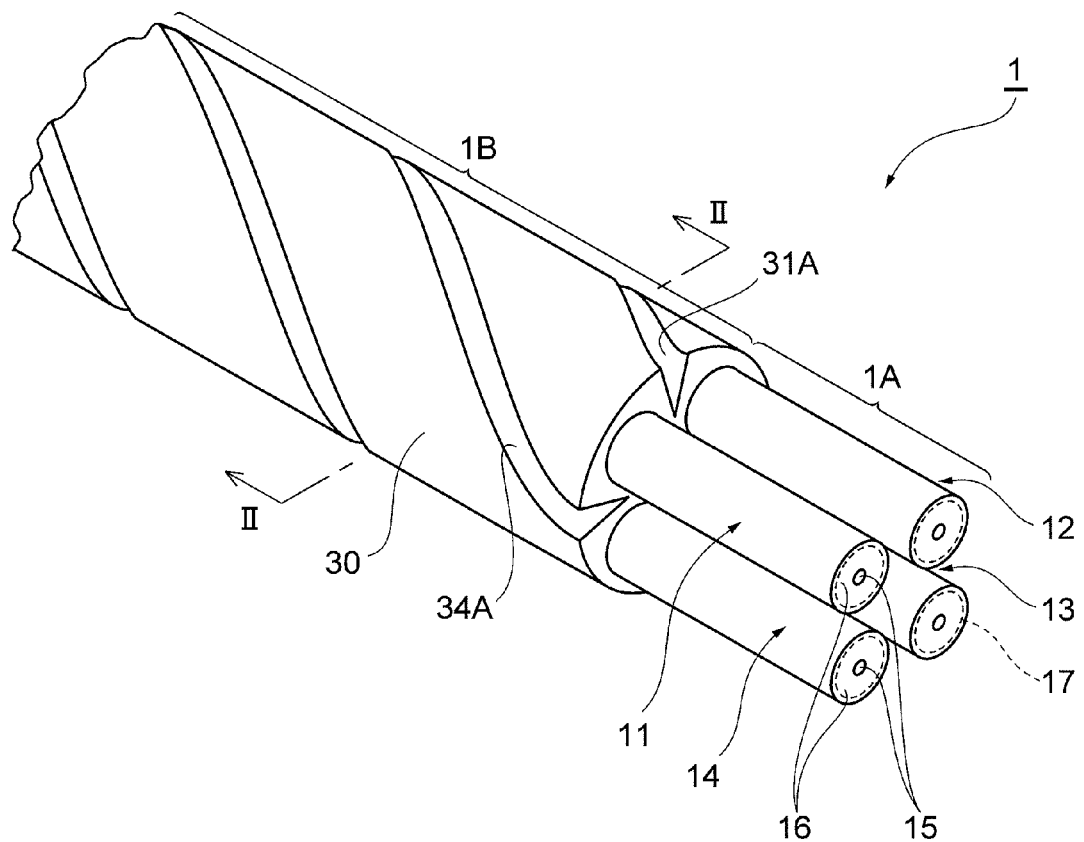
FIG. 1 is a view showing a schematic configuration of a first embodiment of a multi-core optical fiber according to the present invention.

In the following, embodiments of a multi-core optical fiber and a producing method thereof according to the present invention will be described in detail with reference to FIGS. 1 to 4, 5A to 6D, and 7 to 8. In the description of the drawings, identical or corresponding components are designated by the same reference numerals, and overlapping description is omitted.

(First Embodiment)

Figure 2:
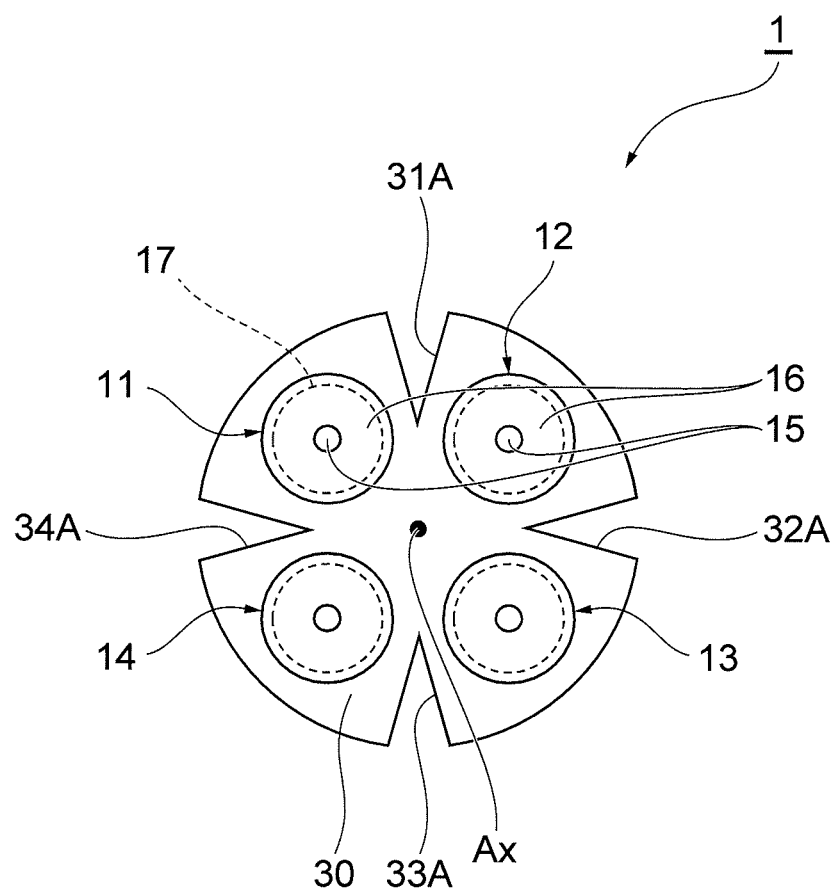
FIG. 2 is a cross-sectional view of the multi-core optical fiber along the line II-II in FIG. 1.

FIG. 1 is a view showing a schematic configuration of a first embodiment of a multi-core optical fiber according to the present invention, and FIG. 2 is a cross-sectional view of the multi-core optical fiber along the line II-II in FIG. 1. As shown in FIGS. 1 and 2, a multi-core optical fiber 1 includes four single-core optical fibers 11, 12, 13, and 14 (hereinafter, expressed by "11 to 14"), and comprises a terminal portion 1A and an intermediate portion 1B. The intermediate portion 1B is a portion in which each outer periphery of the single-core optical fibers 11 to 14 is covered with an integral coating 30 (resin coating). Each of the single-core optical fibers 11 to 14 comprises a core 15 composed of silica-based glass and extending along a central axis $A_X$ of the multi-core optical fiber 1, a cladding 16 composed of silica-based glass and covering an outer periphery of the core 15, and a fiber coating (coating composed of resin or other materials) 17 covering an outer periphery of the cladding 16. Further, as shown in FIG. 1, in the terminal portion 1A at one side (right side of FIG. 1) of the multi-core optical fiber 1, each of the single-core optical fibers 11 to 14 is exposed from the integral coating 30 of the intermediate portion 1B while being separated from each other. The fiber coating 17 may be removed depending on needs. In addition, in the present embodiment, the multi-core optical fiber 1 will be described as a multi-core optical fiber of a configuration including four single-core optical fibers 11 to 14.

In each of the single-core optical fibers 11 to 14, the core 15 and the cladding 16 are composed of silica-based glass. The fiber coating 17 is provided on the outer periphery of each of the single-core optical fibers 11 to 14. A single thin layer or two thin layers, constituted by thin film coating or resin, may be used for the fiber coating 17. As an applicable thin film, a carbon coating, polyimide coating, and the like can be recited. As an applicable resin, ultraviolet (UV) curable resin, thermoplastic resin, thermosetting resin, and the like, having a low Young's modulus, can be recited. Further, in order to remove the integral coating 30 which described below, the fiber coating 17 may be added with a mold releasing agent. In addition, a resin constituting the integral coating 30 is not limited, and in addition to UV curable resin, thermoplastic resin, thermosetting resin, and the like can be used. In other words, it is preferable to use resin having high flexibility.

The single-core optical fibers 11 to 14 covered with the integral coating 30 are integrally twisted while a predetermined arrangement thereof is held along the central axis $A_X$ (a fiber center of the multi-core optical fiber 1). Further, the single-core optical fibers 11 to 14 do not need to be integrally twisted into one direction. SZ integral twist in which a twist direction is periodically changed may be employed. In addition, the whole of the single-core optical fibers 11 to 14 are twisted while the integral coating 30 being interposed between adjacent single-core optical fibers, not twisted while being closely attached to each other.

As shown in FIG. 2, within the multi-core optical fiber 1, the four single-core optical fibers 11 to 14 are two-dimensionally arranged on a cross-section (that is, the surface shown in FIG. 2) orthogonal to the central axis $A_X$. As considering single-core separation every each single-core optical fiber (separation in at least the terminal portion 1A), which will be described below, arrangement of the single-core optical fibers 11 to 14 on the cross-section preferably have the rotational symmetry of order 2 or more with respect to a center (a position matching the central axis $A_X$) of the multi-core optical fiber 1. Further, in view of diameter-reducing, when the single-core optical fibers 11 to 14 are employed for a multi-core optical fiber with four cores, the single-core optical fibers 11 to 14 may have the outer diameter of 60 μm or less, and more preferably, about 50 μm. A single-core optical fiber with a smaller outer diameter according to an increase in the number of cores included in the multi-core optical fiber is employed. In addition, in the present specification, "rotational symmetry" indicates rotational symmetry of a diagram having a maximum area among diagrams obtained by connecting optical axes of adjacent single-core optical fibers with a segment of line, on the cross-section orthogonal to the central axis $A_X$. That is, the single-core optical fibers 11 to 14 included in the multi-core optical fiber 1 is preferably arranged so that an optical axis center of the associated single-core optical fiber is positioned on every one of the vertices of the diagram having the rotational symmetry of order 2 or more on the cross-section.

Even though the integral coating 30 constituting an outer peripheral portion of the multi-core optical fiber 1 has an approximately round cross-section, a recess 31A extending from the surface of the multi-core optical fiber 1 toward the central axis $A_X$ is formed between the adjacent single-core optical fibers 11 and 12. Similarly, a recess 32A is formed between the adjacent single-core optical fibers 12 and 13, a recess 33A is formed between the adjacent single-core optical fibers 13 and 14, and a recess 34A is formed between the adjacent single-core optical fibers 14 and 11. The recesses 31A, 32A, 33A, and 34A (hereinafter, expressed by "31A to 34A") extend along the longitudinal direction (a direction along the central axis $A_X$) of the multi-core optical fiber 1. Functions of the recesses 31A to 34A will be described below. Further, even though the present embodiment describes a structure in which the recesses 31A to 34A are provided in the integral coating 30 constituting the outer peripheral portion of the multi-core optical fiber 1, the shape of the integral coating 30 may be variously modified.

Next, a method of producing the multi-core optical fiber 1 will be described with reference to FIGS. 3 to 4, 5A to 5B, 6, and 7A to 7D. Initially, a method of forming a multi-core optical fiber 100 (a multi-core optical fiber whose terminal portion including an end face thereof has the same structure as the intermediate portion 1B of FIG. 1) from plural single-core optical fibers will be described with reference to FIGS. 3 and 4. Continuously, single-core separation in a terminal portion at one side of the prepared multi-core optical fiber 100 (a method of producing the multi-core optical fiber 1) will be described with reference to FIGS. 5A and 5B. Another method of separating at least a part of a multi-core optical fiber into single-core optical fibers will be described with reference to FIG. 6. Further, another configuration of the multi-core optical fiber 1 will be described with reference to FIGS. 7A to 7D.

Figure 3:
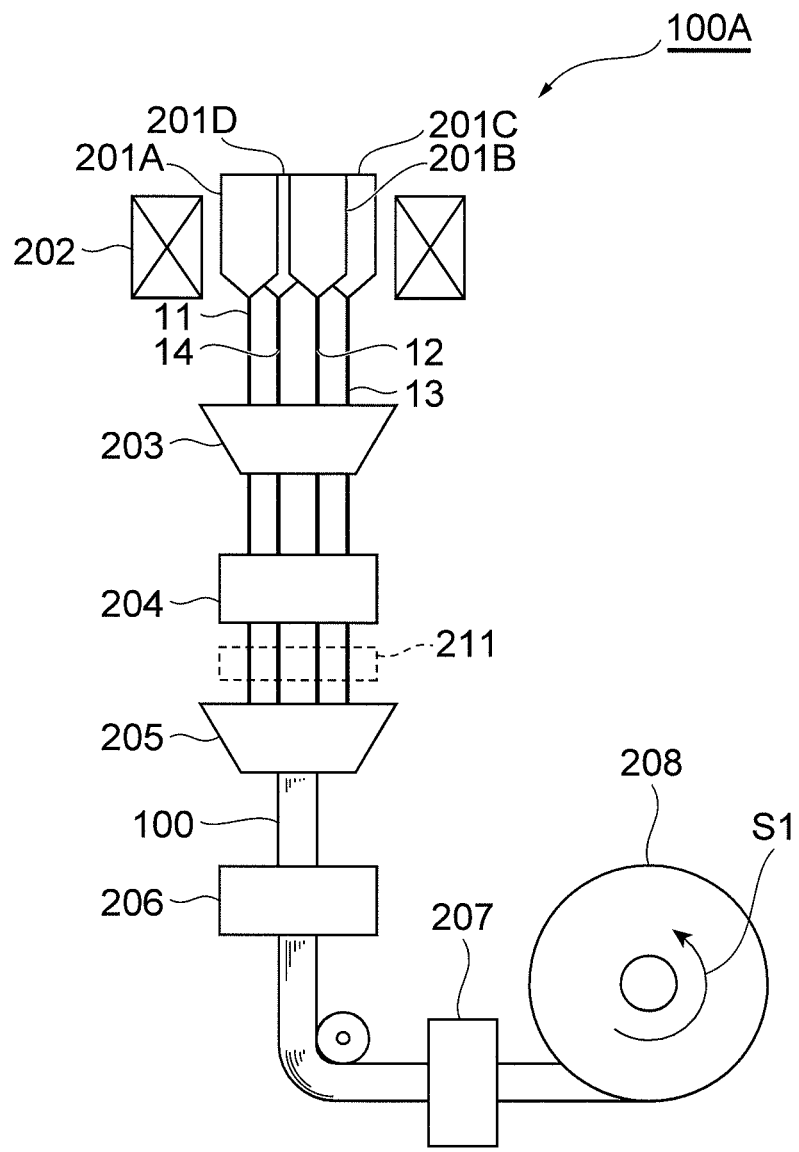
FIG. 3 is a view to describe a configuration example of a production apparatus according to the first embodiment for producing a multi-core optical fiber.

FIG. 3 is a view showing a configuration example of a multi-core optical fiber production apparatus. As shown in FIG. 3, a multi-core optical fiber production apparatus 100A comprises a heater 202 heating terminal portions of four single-core preforms 201A, 201B, 201C, and 201D (hereinafter, expressed by "201A to 201D") each for producing a single-core optical fiber, a resin coating die 203, a resin hardening device 204, a resin coating die 205, a resin hardening device 206, a twisting device 207, and a winding bobbin 208. The four single-core preforms 201A to 201D are two-dimensionally arranged, and then glass portions (bare optical fibers) of the single-core optical fibers 11 to 14 are drawn from the front edge portions of the single-core preforms 201A to 201D heated by the heater 202 and integrated so as to be processed as a multi-core optical fiber by the winding bobbin 208 rotating in a direction indicated by an arrow indicator S1. Through this, the multi-core optical fiber 100 is obtained and the obtained multi-core optical fiber 100 is wound around the winding bobbing 208. The fiber coating 17 is applied to a glass portion of each of the single-core optical fibers 11 to 14 by the resin coating die 203. Further, each fiber coating 17 is hardened by the resin hardening device 204 whereby the single-core optical fibers 11 to 14 are individually obtained. When a combination of the resin coating die 203 and the resin hardening device 204 is provided in multiple stages, a fiber coating of two layers or more may be formed on each of the single-core optical fibers 11 to 14. Thereafter, the resin coating die 205 integrally coats around each of the four single-core optical fibers 11 to 14 and spaces between the four single-core optical fibers 11 to 14 with a resin coating portion (integral coating 30). Accordingly, the resin coating portion (integral coating 30) is hardened by the resin hardening device 206 and the multi-core optical fiber 100 (multi-core optical fiber whose entire terminal portion including the end face thereof has the same structure as the intermediate portion 1B) is produced. At that time, in a part of the obtained multi-core optical fiber 100 corresponding to the terminal portion 1A, a resin is filled in a space between the adjacent single-core optical fibers among the single-core optical fibers 11 to 14.

Further, the production apparatus may be divided into two parts to perform a process up to the resin hardening device 204 and a process after the resin coating die 205, respectively. In this case, there is no need to draw the single-core optical fibers 11 to 14 together. The single-core optical fibers 11 to 14 individually drawn are respectively wound around the associated bobbins after forming a resin coating layer. Thereafter, in another production apparatus, the single-core optical fibers 11 to 14 are respectively withdrawn from the associated bobbins and a process after the resin coating die 205 is performed. A configuration of integrally twisting the single-core optical fibers 11 to 14 and then making the integrally twisted single-core optical fibers 11 to 14 pass through the resin coating die 205 may be employed for the production apparatus. In this case, the twisting device 207 may not necessarily be used.

Figure 4:
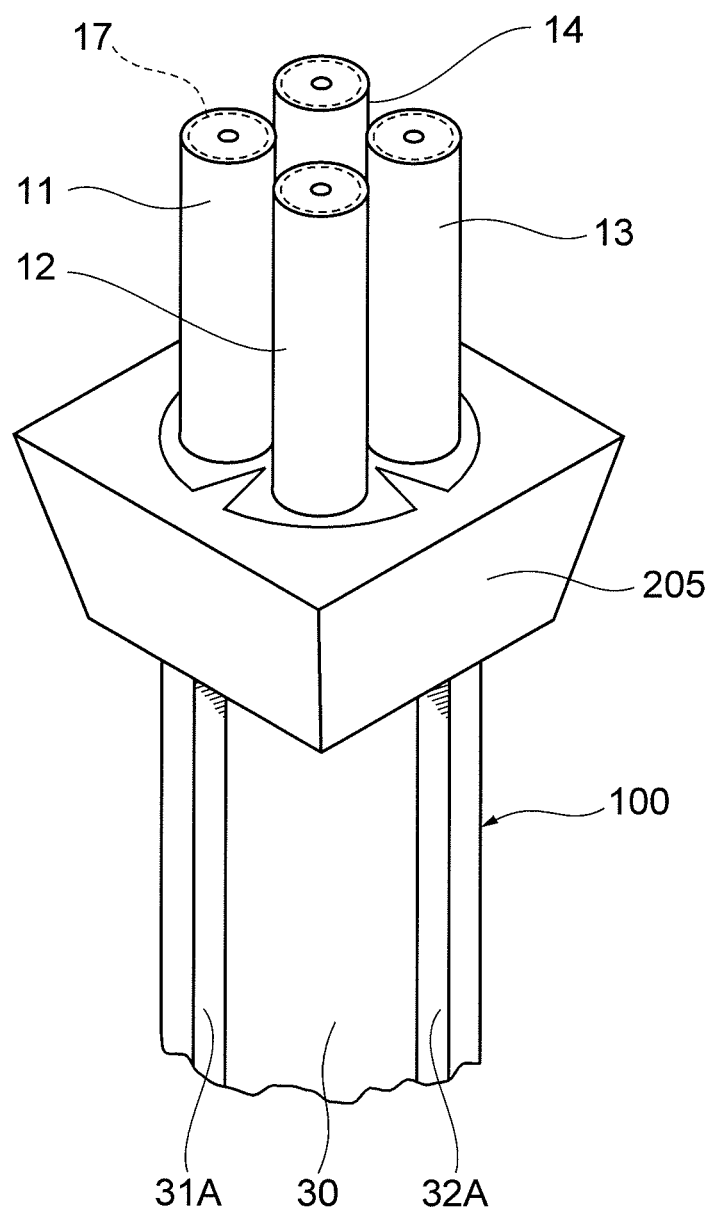
FIG. 4 is a view to describe a resin coating die included in the production apparatus of FIG. 3.

Here, the shape of a die passed by the four single-core optical fibers 11 to 14 in the resin coating die 205 approximately matches an external form of the multi-core optical fiber 1 (that is, the outer peripheral shape of the cross-sectional view of the multi-core optical fiber shown in FIG. 2). Accordingly, as shown in FIG. 4, the recesses 31A to 34A are formed on the surface of the integral coating 30 after the integral coating 30 passes through the resin coating die 205. As described above, by appropriately transforming the shape of an outlet of the resin coating die 205, it is possible to change the external form of the multi-core optical fiber 100.

Further, the integral coating 30 (resin coating), passing through the resin coating die 205 and thereby formed around each of the single-core optical fibers 11 to 14, is hardened by the resin hardening device 206. When resin applied by the resin coating die 205 is UV curable resin, a UV lamp is used for the resin hardening device 206. As described above, the resin hardening device 206 is an apparatus for hardening resin and an appropriate apparatus is selected and used based on a property of resin. In addition, if necessary, with respect to the single-core optical fibers 11 to 14, a single-core optical fiber twisting device 211 may be provided between the resin hardening device 204 and the resin coating die 205, as shown in FIG. 3. In this case, each glass portion of the single-core optical fibers 11 to 14 may be individually twisted by the single-core optical fiber twisting device 211 while glass material thereof is softened at the neck down of four single-core preforms 201A to 201D. However, the glass portion is hardened together with hardening of the resin coating layer and thus, physical twist strain does not remain in the glass portion. However, as described above, a resin is applied with respect to the integrally twisted single-core optical fibers 11 to 14 so as to cover the surface of the single-core optical fibers 11 to 14 by the resin coating die 205. Accordingly, the single-core optical fibers 11 to 14 are fixed while being integrally twisted in resin. Moreover, when the multi-core optical fiber is wound by the winding bobbin 208, the twisting device 207 for twisting after-resin-hardened multi-core optical fiber is provided in a front stage of the winding bobbin 208 in order to prevent strain from occurring due to a difference in a winding length between the single-core optical fibers arranged so as to sandwich the center axis $A_X$, in the multi-core optical fiber wound around the winding bobbin 208. The multi-core optical fiber 100 obtained through the above configuration is twisted by the twisting device 207 and then is wound around the winding bobbin 208. In the above twisting, twist may be suppressed by providing a roller between the twisting device 207 and resin hardening device 206 in order to possibly prevent twisting by the twisting device 207 from being transferred to the resin hardening device 206. A twist direction by the twisting device 207 may be a uni-directional integral twist or SZ integral twist in which a direction is periodically changed. From the above, the multi-core optical fiber 100 of which the outer peripheral portion is all covered with the integral coating 30 is produced.

Figure 5A:
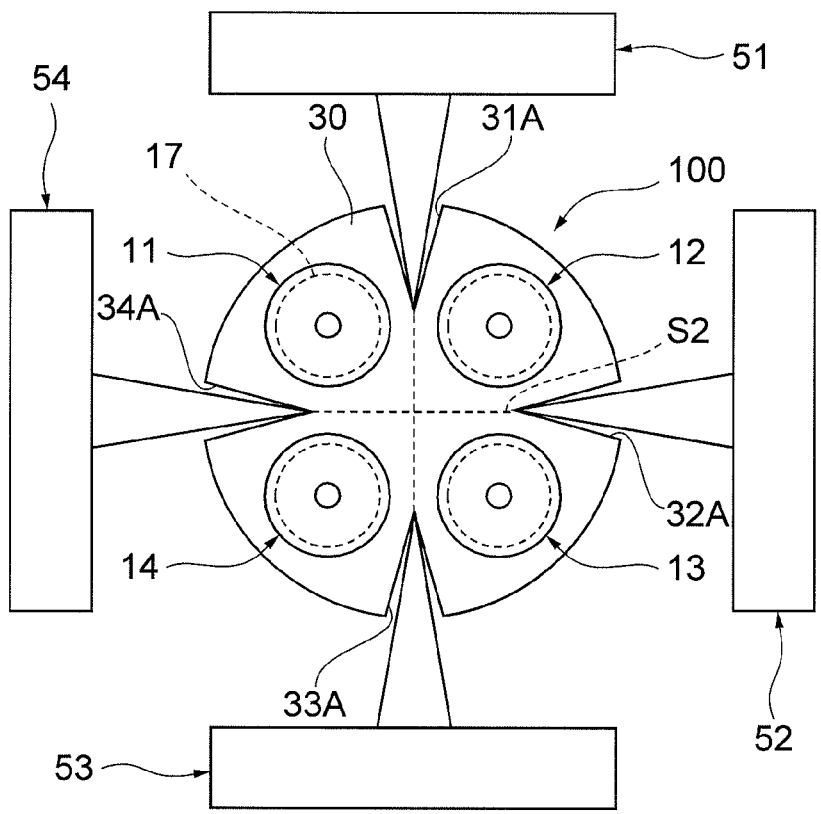
FIGS. 5A and 5B are views to describe a method according to the first embodiment for separating a terminal portion of a multi-core optical fiber into single-core optical fibers.
Figure 5B:
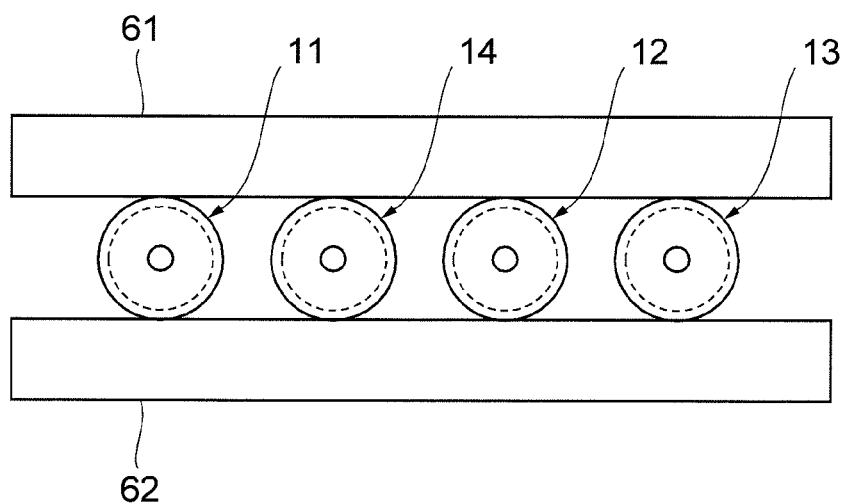

Next, single-core separation in at least one terminal portion of the multi-core optical fiber 100 produced as above (first embodiment of the method of producing the multi-core optical fiber 1) will be described with reference to FIGS. 5A and 5B. As shown in FIG. 5A, initially, jigs 51, 52, 53, and 54 (hereinafter, expressed by "51 to 55") are used, and the integral coating 30 of the terminal portion (a part corresponding to the terminal portion 1A shown in FIG. 1) in the multi-core optical fiber 100 produced as above is mechanically cut. Specifically, the terminal portion of the prepared multi-core optical fiber 100 is pinched from a vertical direction of FIG. 5A using the jigs 51 and 53, and the terminal portion of the prepared multi-core optical fiber 100 is pinched from a horizontal direction of FIG. 5A using the jigs 52 and 54. In this case, tips of the drill-shaped jigs 51 to 54 are respectively inserted in the recesses 31A to 34A formed in the integral coating 30 of the prepared multi-core optical fiber 100. Next, cracks occur in the integral coating 30 by respectively moving the jigs 51 to 54 toward the central axis (an axis corresponding to the central axis $A_X$ of FIG. 2) of the prepared multi-core optical fiber 100. Further, the cracks occurring in the integral coating 30 become wide by respectively moving the jigs 51 to 54 along the longitudinal direction of the prepared multi-core optical fiber 100 along the recesses 31A to 34A. In this case, the integral coating 30 is divided at positions indicated by a dotted line S2 of FIG. 5A whereby the four single-core optical fibers 11 to 14 covered with the integral coating 30 are individually separated from each other. In addition, when the cross-section arrangement of the single-core optical fibers 11 to 14 included in the prepared multi-core optical fiber 100 has the rotational symmetry of order 2 or more with respect to the central axis of the prepared multi-core optical fiber 100, separation using such jigs 51 to 54 is appropriately performed as described above.

Figure 6:
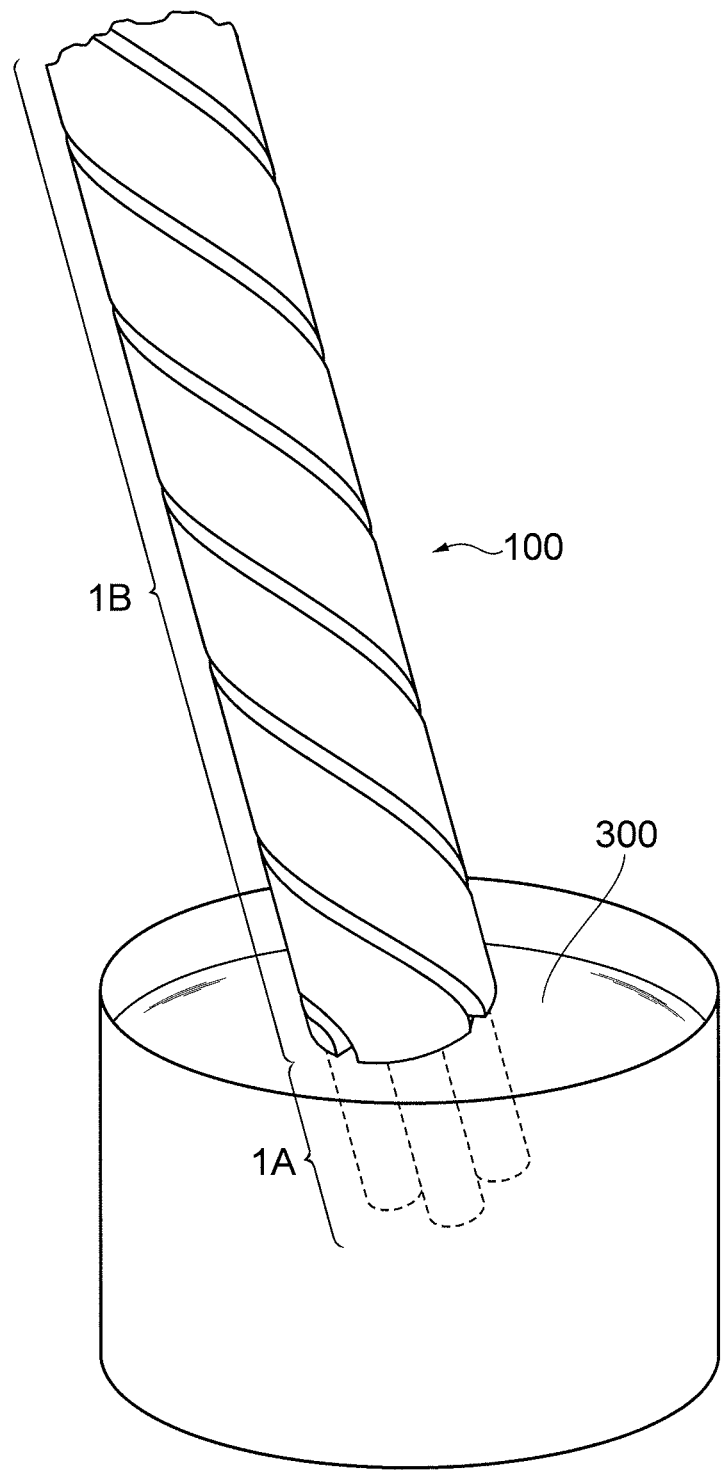
FIG. 6 is a view to describe a method according to a second embodiment for separating a terminal portion of a multi-core optical fiber into single-core optical fibers.

Next, in the terminal portion of the prepared multi-core optical fiber 100, the integral coating 30 remaining around each of the separated single-core optical fibers 11 to 14 is removed. The integral coating 30 remaining around each of the single-core optical fibers 11 to 14 may be easily removed by lightly rubbing the surface of the integral coating 30 using a brush-shaped member. Furthermore, as shown in FIG. 6, the terminal portion of the multi-core optical fiber 100 mey be soaked in a solution 300 to dissolve the integral coating 30 covering the single-core optical fibers 11 to 14 in the terminal portion. In this case, the terminal portion soaked in the solution 300 corresponds to the terminal portion 1A shown in FIG. 1, and the remaining portion of the multi-core optical fiber 100 corresponds to the intermediate portion 1B shown in FIG. 1. For example, in a state where softening of the integral coating 30, occurred due to swollenness thereof by an organic solvent such as alcohol and the like, makes removal of the integral coating 30 become easy, an organic solvent may be used for removing the integral coating 30 if necessary. In addition, the integral coating 30 may be removed by only applying an organic solvent. Moreover, by only rubbing the surface of the integral coating 30 using the brush-shaped member without cutting the integral coating 30 using the jigs 51 to 54, the integral coating 30 may be removed and the single-core optical fibers 11 to 14 may be separated from each other.

Figure 7A:
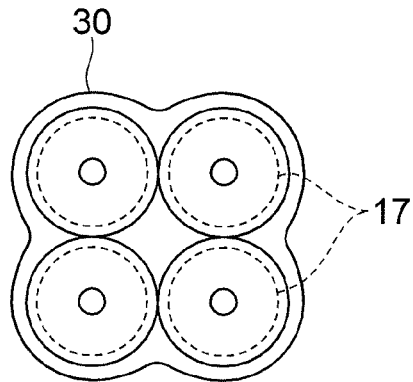
FIGS. 7A to 7D are views to describe another configuration example of a multi-core optical fiber according to the first embodiment.
Figure 7B:
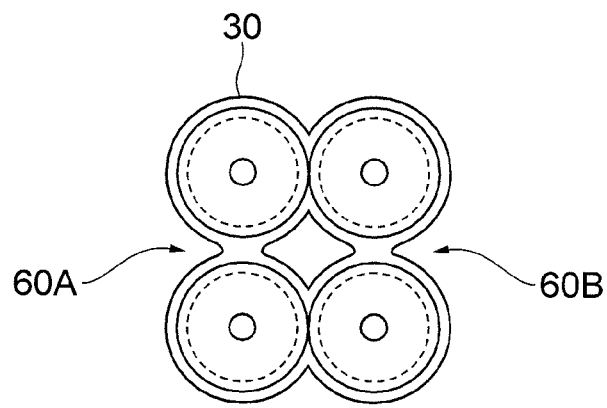
Figure 7C:
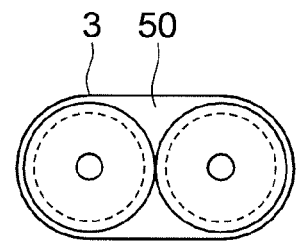
Figure 7D:
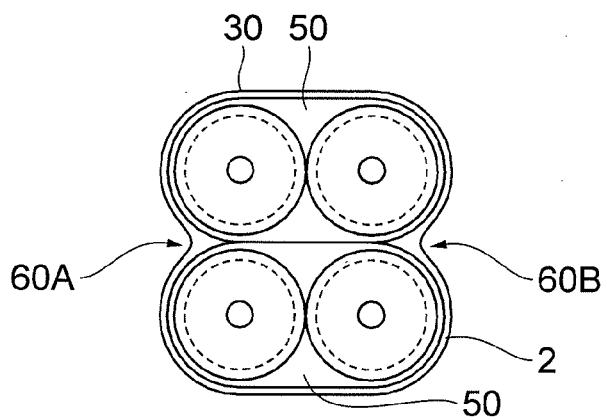

In the above, as shown in FIG. 7A, the integral coating 30 may be a thin film coating. In this case, single-core optical fibers may be separated from each other by rubbing and thereby removing the thin film integral coating 30 with a flexible member such as a brush and the like, which is the same as the aforementioned method. Further, a structure of FIG. 7B, for example, a structure in which every two-cores integrated coating structures are connected to each other is applicable. In a configuration of FIG. 7B, the coating structures integrated every every two-cores are integrated at positions indicated by 60A and 60B. As described above, by rubbing and thereby removing resin of coating portions of 60A and 60B with a flexible member as described above, the structure may be separated into two fiber tapes each constituted by two single-core optical fibers. In addition, in a state where plural two-core fiber tapes 3 are multi-layered as shown in FIG. 7D after single-core optical fibers are processed into a two-core fiber tape 3 as shown in FIG. 7C, a structure in which the single-core optical fibers are integrated into the thin film integral coating 30 is applicable. In a configuration of FIG. 7D, as described above, by rubbing and thereby removing resin of coating portions indicated by 60A and 60B with a flexible member, the structure may be separated into two two-core fiber tapes. Moreover, an Young's modulus of a flexible member for removing a resin of a coating portion is preferably 100 MPa or more but 2000 MPa or less. Further, in a state where softening of the integral coating 30, occurred due to swollenness thereof by an organic solvent such as alcohol and the like, makes removal of the integral coating 30 become easy, an organic solvent may be used for removing the integral coating 30 if necessary. In addition, the integral coating 30 may be removed by only applying an organic solvent.

Each of the single-core optical fibers 11 to 14 of which surrounding integral coating 30 is removed is arranged on the plane after the surface of the cladding 16 thereof is exposed. Specifically, as shown in FIG. 5B, the single-core optical fibers 11 to 14 are arranged in a line by sandwiching the single-core optical fibers 11 to 14 using jigs 61 and 62. As described above, the arrangement, in which the single-core optical fibers 11 to 14 individually separated are arranged in a line on a single plane in the terminal portion 1A, is the same as a fiber tape terminal portion arrangement. Therefore, using a known method, it is possible to easily perform fusion connection or connector adhesion processing between the separated single-core optical fiber and different single-core optical fibers.

As described above, in accordance with the multi-core optical fiber 1 and a method of producing the multi-core optical fiber 1 (single-core separation in the terminal portion) according to the present embodiment, in the intermediate portion 1B, four single-core optical fibers 11 to 14, each including the core 15 and the cladding 16 which are composed of silica-based glass, are integrated by the integral coating 30. Meanwhile, in the terminal portion 1A, the single-core optical fibers 11 to 14 are separated from each other by mechanically cutting, mechanically or physically removing, or chemically removing the integral coating 30. Accordingly, even for the multi-core optical fiber that includes single-core optical fibers each having a core and a cladding which are composed of silica-based glass, a structure enabling easy single-core separation may be implemented.

Further, similar to the multi-core optical fiber 1 of the above embodiment, in the case that the single-core optical fibers 11 to 14 are drawn while being individually twisted, the case that the single-core optical fibers 11 to 14 are integrally twisted within the integral coating 30 of the multi-core optical fiber 1, or the case that the multi-core optical fiber 1 itself is twisted, polarization-mode dispersion in each core decreases. In addition, as a unique problem of the multi-core optical fiber, there is a crosstalk between cores. When bending the multi-core optical fiber 1, variation in crosstalk between cores becomes pronounced. However, the effect by bending is equalized due to applying a twist, as described above, whereby the variation in crosstalk between cores decreases.

Further, since the multi-core optical fiber 1 is wound around the winding bobbin 208 while being twisted by the twisting device 207, it is possible to prevent an increase in strain that occurs due to a difference in a winding length between the single-core optical fibers 11 to 14 included in the multi-core optical fiber 1.

(Second Embodiment)

Figure 8:
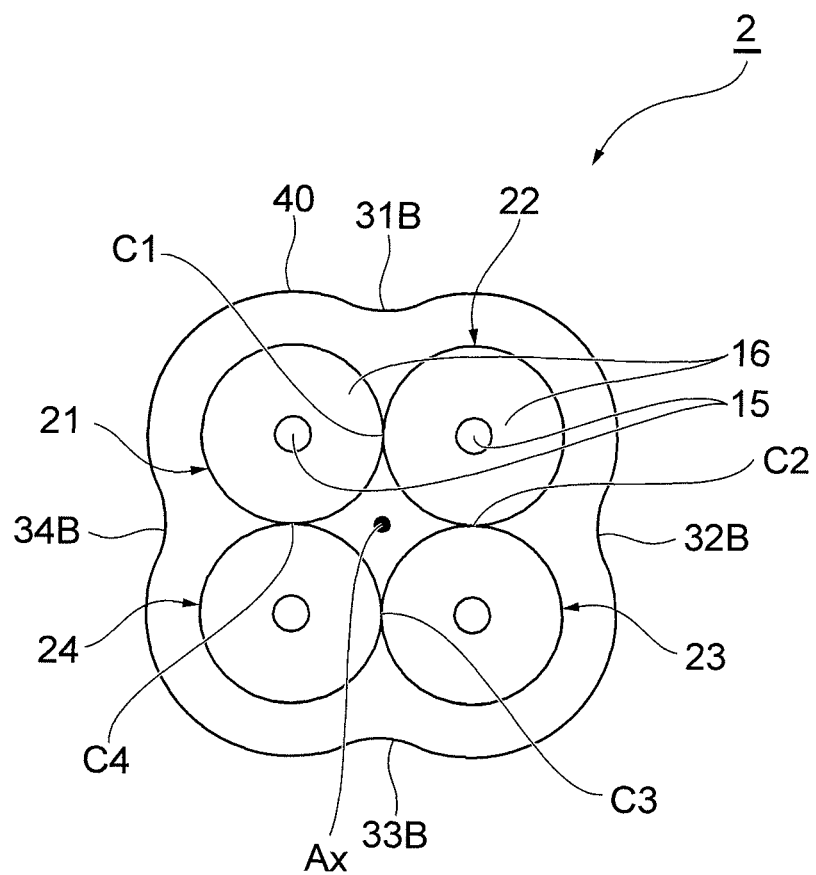
FIG. 8 is a cross-sectional view of a second embodiment of a multi-core optical fiber according to the present invention.

Next, a second embodiment of a multi-core optical fiber according to the present invention will be described. FIG. 8 is a cross-sectional view showing a configuration of a multi-core optical fiber 2 according to the second embodiment. Similar to FIG. 2, FIG. 8 corresponds to a cross-section of an intermediate portion along the line II-II in FIG. 1.

A difference between the multi-core optical fiber 2 according to the second embodiment and the multi-core optical fiber 1 according to the first embodiment is as follows. That is, the multi-core optical fiber 2 is different from the multi-core optical fiber 1 according to the first embodiment, in that claddings of adjacent single-core optical fibers are integrated while being in direct contact with each other.

As shown in FIG. 8, the multi-core optical fiber 2 includes integrated four single-core optical fibers 21, 22, 23, and 24 (hereinafter, expressed by "21 to 24"), and comprises an intermediate portion and a terminal portion, which is similar to the first embodiment. In the intermediate portion, the outer periphery of the integrated single-core optical fibers 21 to 24 is covered with a protective coating 40 (resin coating). Each of the single-core optical fibers 21 to 24 comprises a core 15 composed of silica-based glass and extending along a central axis $A_X$ of the multi-core optical fiber 2 and a cladding 16 composed of silica-based glass and covering an outer periphery of the core 15. The adjacent single-core optical fiber 21 and single-core optical fiber 22 are integrated in a state where both claddings of the single-core optical fibers 21 and 22 are in contact with each other at a joined portion C1. Similarly, the adjacent single-core optical fiber 22 and single-core optical fiber 23 are integrated by cladding contact at a joined portion C2, the adjacent single-core optical fiber 23 and single-core optical fiber 24 are integrated by cladding contact at a joined portion C3, and the adjacent single-core optical fiber 24 and single-core optical fiber 21 are integrated by cladding contact at a joined portion C4. Basically, glass and resin materials are not present in the central space of the multi-core optical fiber 2 surrounded by the single-core optical fibers 21 to 24. In view of diameter-reducing, the single-core optical fibers 21 to 24 may have the outer diameter of 60 μm or less, and generally have the outer diameter of about 50 μm.

Further, the protective coating 40 provided around the single-core optical fibers 21 to 24 of the multi-core optical fiber 2 is provided to protect the single-core optical fibers 21 to 24. A resin constituting the protective coating 40 is not particularly limited and thermoplastic resin, thermosetting resin, and the like in addition to UV curable resin can be used.

In addition, the shape of the protective coating 40 is not particularly limited. For example, when using a highly flexible material as the protective coating 40, the protective coating 40 may have the shape according to each external form (cross-sectional shape) of the single-core optical fibers 21 to 24.

In the protective coating 40 of the multi-core optical fiber 2 shown in FIG. 8, a recess 31B extending toward the central axis $A_X$ of the multi-core optical fiber 2 is formed in a portion positioned between the adjacent single-core optical fibers 21 and 22. Similarly, in the protective coating 40, a recess 32B is formed in a portion positioned between the adjacent single-core optical fibers 22 and 23, a recess 33B is formed in a portion positioned between the adjacent single-core optical fibers 23 and 24, and a recess 34B is formed in a portion positioned between the adjacent single-core optical fibers 24 and 21. The recesses 31B, 32B, 33B, and 34B (hereinafter, expressed "31B to 34B") extend along the longitudinal direction of the multi-core optical fiber 2 along the central axis $A_X$. Functions of the recesses 31B to 34B are the same as the first embodiment. Further, in the present embodiment, a structure in which the recesses 31B to 34B are provided in the protective coating 40 constituting the outer peripheral portion of the multi-core optical fiber 2 may be variously modified.

Figure 9:
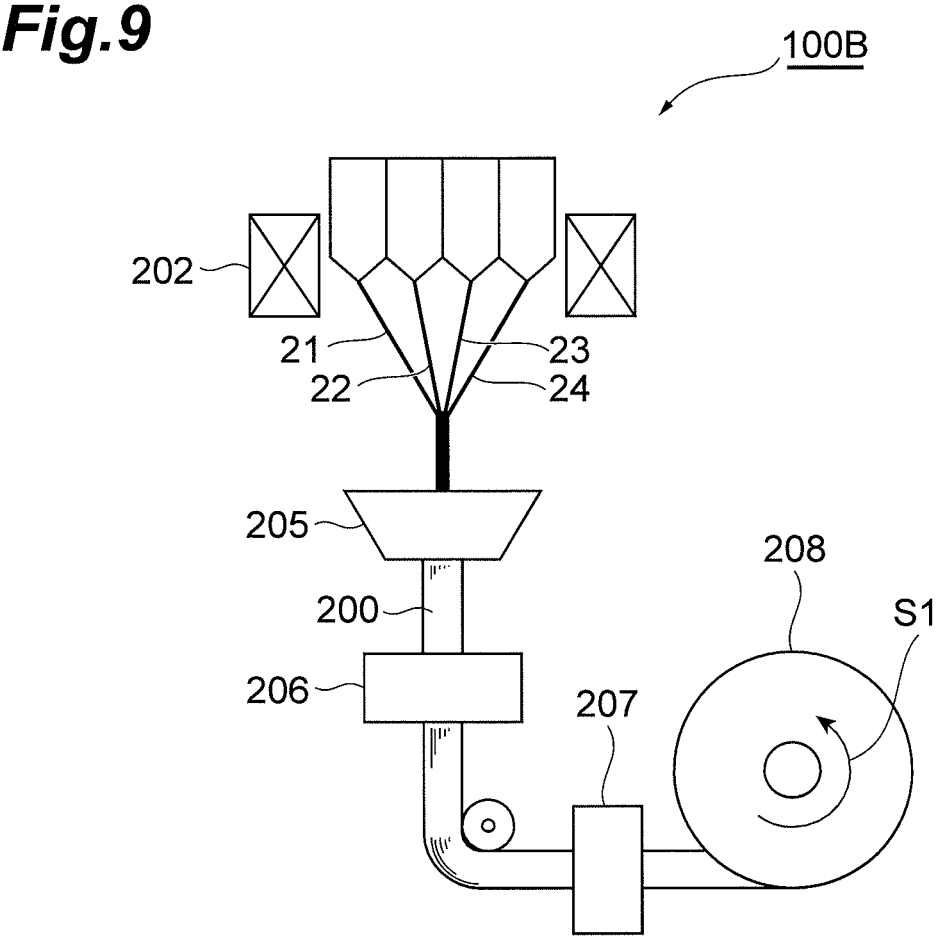
FIG. 9 is a view to describe a configuration example of a production apparatus according to the second embodiment for producing a multi-core optical fiber.

Next, FIG. 9 shows another configuration of a multi-core optical fiber production apparatus (apparatus for producing the multi-core optical fiber 2 according to the second embodiment). A multi-core optical fiber production apparatus 100B of FIG. 9 comprises a heater 202 heating terminal portions of four single-core preforms 201A to 201D each for producing a single-core optical fiber, a resin coating die 205, a resin hardening device 206, a twisting device 207, and a winding bobbin 208. The four single-core preforms 201A to 201D are two-dimensionally arranged, and then glass portions of the single-core optical fibers 21 to 24 are drawn. In this case, the glass portions are integrally drawn in a state where adjacent claddings 16 are in contact with each other. The integrated glass portions of the single-core optical fibers 21 to 24 are integrally coated with the protective coating 40 by the resin coating die 205. Further, by hardening the protective coating 40 using the resin hardening device 206, the multi-core optical fiber 200 (a multi-core optical fiber whose terminal portion including an end face thereof has the cross-section structure of FIG. 8) is obtained. Similar to the production apparatus of FIG. 3, the multi-core optical fiber 200 is twisted by the twisting device 207 and is wound around the winding bobbin 208. In the above twisting, twisting may be suppressed by providing a roller between the twisting device 207 and the resin hardening device 206 in order to possibly prevent twisting by the twisting device 207 from being transferred to the resin hardening device 206. In addition, unlike FIG. 3, twisting by the twisting device 207 may be possibly transferred to the resin hardening device 206. In this case, the glass portions of the single-core optical fibers 21 to 24 are integrally twisted at the neck down of four single-core preforms 201A to 201D. However, the glass portion is hardened together with hardening of the resin coating layer and thus, physical twist strain does not remain. The multi-core optical fiber 200 includes a resin portion while being twisted and thus, prevents strain from occurring due to a difference in a winding length between the single-core optical fibers arranged so as to sandwich the center axis $A_X$, in the multi-core optical fiber wound around the winding bobbin 208.

In the multi-core optical fiber 200 produced by the above production apparatus 100B (FIG. 9), by two-dimensionally arranges four single-core preforms, making the four single-core preforms contact with each other, and heating the two-dimensionally arranged single-core preforms using the heater, single-core optical fibers are obtained. Here, before single-core optical fibers are hardened, adjacent single-core optical fibers are in contact with each other. In this state, four single-core optical fibers are integrated whereby a group of the integrated single-core optical fibers 21 to 24 constituting a part of the multi-core optical fiber 2 according to the second embodiment is formed. Further, the protective coating 40 covering the outer periphery of the group of the four single-core optical fibers is formed by attaching protective resin to the group of the four single-core optical fibers.

Further, similar to the multi-core optical fiber 1 (in particular, the intermediate portion 1B) according to the first embodiment, it is possible to twist and draw each of single-core optical fibers of which claddings are fused. For example, before drawing, only disposed portions of front edge portions of plural single-core preforms are integrated by heating and softening the surface thereof, and the integrated portion is used as a dropping part. By heating the integrated portion and dropping the heated integrated portion, a continued portion thereof can be drawn as a group of the integrated single-core optical fibers. An integration method of the group of the single-core optical fibers is not limited to integration of the front edge portions of the prepared single-core preforms. Integration may be performed with respect to the surface (surface corresponding to a cladding) of a body part of each single-core preform. In this case, similar to the multi-core optical fiber 1 according to the first embodiment, it is possible to decrease polarization-mode dispersion of each single-core optical fiber. In addition, similar to the multi-core optical fiber 1 (multi-core optical fiber 100 before single-core separation in the terminal portion) according to the first embodiment, when employing a configuration of adding the multi-core optical fiber 200 with twist while winding the multi-core optical fiber 200 around the winding bobbin after drawing, it is possible to prevent an increase in strain that occurs due to a difference in a winding length between the single-core optical fibers 21 to 24 included in the multi-core optical fiber 200.

Next, single-core separation (a method of producing the multi-core optical fiber 2) in one terminal portion of the multi-core optical fiber 200 will be described. Initially, the protective coating 40 provided on an outer peripheral portion of the multi-core optical fiber 200 produced by the production apparatus 100B of FIG. 9 is removed. Similar to the methods disclosed in the first embodiment, the above removal is performed by a method of lightly rubbing the surface of the protective coating 40 using a flexible member such as a brush, a method of applying an organic solvent, and the like. Further, as shown in FIG. 5A, the protective coating 40 may be mechanically removed. Next, the single-core optical fibers 21 to 24 of the multi-core optical fiber 200 in which the protective coating 40 is removed are separated from each other by dissolving glasses of the joined portions C1, C2, C3, and C4 (hereinafter, expressed by "C1 to C4") between the respective single-core optical fibers using chemicals, as shown in for example FIG. 6.

In the present embodiment, the claddings 16 are composed of glass, and then hydrofluoric acid is applied to areas corresponding to the joined portions C1 to C4 between the respective single-core optical fibers 21 to 24. By dissolving a portion of the claddings 16 in the areas corresponding to the joined portions C1 to C4, the single-core optical fibers 21 to 24 can be individually separated from each other. In addition, to stabilize an etching amount, it is preferable that weight concentration of hydrofluoric acid falls within the range of 10%±1%. Moreover, in this instance, the temperature of hydrofluoric acid is preferably 25° C.±5° C. By satisfying the above conditions, the etching amount can be adjusted within the range of ±50 nm, and separation having excellent etching reproducibility is enabled.

As described above, in accordance with the multi-core optical fiber 2 and a method (single-core separation in a terminal portion) of producing the multi-core optical fiber 2 according to the present embodiment, in the intermediate portion, the claddings of the adjacent single-core optical fibers among four single-core optical fibers 21 to 24 which are two-dimensionally arranged in the cross-section orthogonal to the central axis of the multi-core optical fiber 2 and each of which has the core 15 and the cladding 16, which are composed of silica-based glass, are integrated with each other. The outer sides of the integrated four single-core optical fibers 21 to 24 are covered with the protective coating 40. In the terminal portion of the multi-core optical fiber 2, the four single-core optical fibers 21 to 24 are individually separated from each other. The single-core optical fibers 21 to 24 in the terminal portion are separated from each other by mechanically or chemically removing the protective coating 40 and then dissolving portions of the adjacent claddings 16. As described above, even for the multi-core optical fiber 2 that includes single-core optical fibers 21 to 24 each having the core 15 and cladding 16 which are composed of silica-based glass, single-core separation in the terminal portion can be easily performed.

Even though embodiments of the present invention are described above, the present invention is not limited to the embodiments and various modifications may be made.

For example, even though the embodiments describe a multi-core optical fiber including four single-core optical fibers, the number of single-core optical fibers is not particularly limited.

Further, the external form (cross-sectional shape) of the protective coating 40 of the multi-core optical fiber 2 according to the second embodiment is not limited to the shape of a recess provided for individual separation of single-core optical fibers, as described in the first embodiment, and thus may be appropriately modified according to a use environment of the multi-core optical fiber and the like. When changing the external form of the protective coating 40, the shape of a die for coating resin may be changed.

As described above, in accordance with the present invention, there can be provided a multi-core optical fiber in which plural single-core optical fibers each having a core and a cladding, which are composed of silica-based glass, are two-dimensionally arranged on the cross-section thereof and thus, can be easily provided a multi-core optical fiber having the structure that enables individual separation of single-core optical fibers to be easily performed in at least a terminal portion and a method of producing the same.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multi-core optical fiber which includes plural single-core optical fibers each having a core composed of silica-based glass, and a cladding composed of silica-based glass and provided on an outer periphery of the core, the multi-core optical fiber comprising:

an intermediate portion in which the plural single-core optical fibers are integrally held by a resin layer, the plural single-core optical fibers being integrally twisted while being two-dimensionally arranged at predetermined positions on a cross-section orthogonal to a longitudinal direction of the multi-core optical fiber; and
a terminal portion in which the plural single-core optical fibers are exposed from the resin layer constituting a part of the intermediate portion and separated from each other,
wherein the cladding has a glass surface and the claddings of adjacent single-core optical fibers among the plural single-core optical fibers are fused at the glass surfaces thereof to form an integrated glass body, and
wherein the resin layer includes a protective coating protecting side surfaces of the integrated glass body.

2. A multi-core optical fiber which includes plural single-core optical fibers each having a core composed of silica-based glass, and a cladding which is composed of silica-based glass, provided on an outer periphery of the core and has a glass surface, the multi-core optical fiber comprising:
an intermediate portion in which the plural single-core optical fibers are integrally twisted while being two-dimensionally arranged at predetermined positions on a cross-section orthogonal to a longitudinal direction of the multi-core optical fiber, the claddings of adjacent single-core optical fibers being fused at the glass surfaces thereof to form an integrated glass body, the integrated glass body being covered by a protective coating; and
a terminal portion in which the plural single-core optical fibers are exposed from the protective coating constituting a part of the intermediate portion, and in which the plural single-core optical fibers are separated from each other.

3. The multi-core optical fiber according to claim 2, wherein, on the cross-section of the intermediate portion, arrangement of the plural single-core optical fibers has rotational symmetry of order 2 or more with respect to a center of the multi-core optical fiber, and
wherein, in the terminal portion, the plural single-core optical fibers are one-dimensionally arranged.

4. The multi-core optical fiber according to claim 2, wherein the multi-core optical fiber is wounded around a bobbin while the protective coating is twisted.

5. The multi-core optical fiber according to claim 2, wherein, in the intermediate portion, a recess extending along the longitudinal direction is provided on the protective coating.

6. A method of producing a multi-core optical fiber as set forth in claim 2, the method comprising the steps of:
preparing a multi-core optical fiber which includes plural single-core optical fibers each having a core composed of silica-based glass, and a cladding which is composed of silica-based glass, provided on an outer periphery of the core, and has a glass surface, the plural single-core optical fibers being integrally twisted while being two-dimensionally arranged at predetermined positions on a cross-section orthogonal to a longitudinal direction of the multi-core optical fiber, the claddings of adjacent single-core optical fibers being fused at parts of the glass surfaces thereof to form an integrated glass body, the integrated glass body being covered by a protective coating;
physically removing the protective coating which covers the integrated glass body, in a terminal portion of the prepared multi-core optical fiber; and
separating the claddings of the plural single-core optical fibers, exposed from the protective coating, from each other by dissolving, using a solution, a fused part of the glass surfaces of the adjacent single-core optical fibers among the plural single-core optical fibers.

7. A multi-core optical fiber comprising:
plural single-core optical fibers each having a core composed of silica-based glass, a cladding composed of silica-based glass and provided on an outer periphery of the core, and a fiber coating provided on an outer periphery of the cladding; and
a resin layer integrally holding the plural single-core optical fibers in an intermediate portion of the multi-core optical fiber, the plural single-core optical fibers being integrally twisted while being two-dimensionally arranged at predetermined positions on a cross-section orthogonal to a longitudinal direction of the multi-core optical fiber,
wherein, in the intermediate portion, an entire outer periphery of each of the plural single-core optical fibers is covered by the resin layer, and
wherein the resin layer includes an integral coating for integrating the plural single-core optical fibers,
wherein, on the cross-section of the intermediate portion, arrangement of the plural single-core optical fibers has rotational symmetry of order 2 or more with respect to a center of the multi-core optical fiber, and
wherein, in a terminal portion of the multi-core optical fiber, the plural single-core optical fibers are one-dimensionally arranged.

8. The multi-core optical fiber according to claim 7, wherein each of the plural single-core optical fibers is drawn while being individually twisted.

9. The multi-core optical fiber according to claim 7, wherein, in the intermediate portion, a recess extending along the longitudinal direction is provided on the integral coating.

10. The multi-core optical fiber according to claim 7, wherein an outer diameter of each of the single-core optical fibers is 60 μm or less.

11. The multi-core optical fiber according to claim 10, wherein the outer diameter of each of the single-core optical fibers is 50 μm or less.

12. The multi-core optical fiber according to claim 7, wherein the fiber coating of each of the single-core optical fibers is added with a mold releasing agent.

13. The multi-core optical fiber according to claim 7, wherein the resin layer is composed of a material removable by a flexible member.

14. A multi-core optical fiber comprising:
plural single-core optical fibers each having a core composed of silica-based glass, a cladding composed of silica-based glass and provided on an outer periphery of the core, and a fiber coating provided on an outer periphery of the cladding; and
an integral coating integrating the plural single-core optical fibers in an intermediate portion of the multi-core optical fiber, the plural single-core optical fibers and the integral coating being integrally twisted while being two-dimensionally arranged at predetermined positions on a cross-section orthogonal to a longitudinal direction of the multi-core optical fiber,
wherein, in the intermediate portion, an entire outer periphery of each of the plural single-core optical fibers is covered by the integral coating, and
wherein an outer diameter of each of the single-core optical fibers is 60 μm or less.

15. The multi-core optical fiber according to claim 14, wherein the outer diameter of each of the single-core optical fibers is 50 μm or less.

16. The multi-core optical fiber according to claim 14, wherein the integrating coating is composed of a material removable by a flexible member.

17. The multi-core optical fiber according to claim 14, wherein, on the cross-section of the intermediate portion, arrangement of the plural single-core optical fibers has rotational symmetry of order 2 or more with respect to a center of the multi-core optical fiber, and
wherein, in a terminal portion of the multi-core optical fiber, the plural single-core optical fibers are one-dimensionally arranged.

18. The multi-core optical fiber according to claim 14, wherein each of the plural single-core optical fibers is drawn while being individually twisted.

19. The multi-core optical fiber according to claim 14, wherein the multi-core optical fiber is wounded around a bobbin while the integral coating is twisted.

20. The multi-core optical fiber according to claim 14, wherein, in the intermediate portion, a recess extending along the longitudinal direction is provided on the integral coating.

21. A multi-core optical fiber comprising:
plural single-core optical fibers each having a core composed of silica-based glass, a cladding composed of silica-based glass and provided on an outer periphery of the core and a fiber coating provided on an outer periphery of the cladding; and
an integral coating integrating the plural single-core optical fibers in an intermediate portion of the multi-core optical fiber, the plural single-core optical fibers and the integral coating being integrally twisted while being two-dimensionally arranged at predetermined positions on a cross-section orthogonal to a longitudinal direction of the multi-core optical fiber,
wherein, in the intermediate portion, an entire outer periphery of each of the plural single-core optical fibers is covered by the integral coating, and
wherein the fiber coating of each of the single-core optical fibers is added with a mold releasing agent.

22. The multi-core optical fiber according to claim 21, wherein, on the cross-section of the intermediate portion, arrangement of the plural single-core optical fibers has rotational symmetry of order 2 or more with respect to a center of the multi-core optical fiber, and
wherein, in a terminal portion of the multi-core optical fiber, the plural single-core optical fibers are one-dimensionally arranged.

23. The multi-core optical fiber according to claim 21, wherein each of the plural single-core optical fibers is drawn while being individually twisted.

24. The multi-core optical fiber according to claim 21, wherein the multi-core optical fiber is wounded around a bobbin while the integral coating is twisted.

25. The multi-core optical fiber according to claim 21, wherein, in the intermediate portion, a recess extending along the longitudinal direction is provided on the integral coating.

26. The multi-core optical fiber according to claim 12, wherein the outer diameter of each of the single-core optical fibers is 50 µm or less.

27. The multi-core optical fiber according to claim 7, wherein the outer diameter of each of the single-core optical fibers is 50 µm or less.

28. The multi-core optical fiber according to claim 14, wherein the integral coating includes a resin layer.

29. The multi-core optical fiber according to claim 21, wherein the integral coating includes a resin layer.

* * * * *